2,922,797
Patented Jan. 26, 1960

2,922,797

9α-HALO ALLOPREGNANES

Lewis H. Sarett, Princeton, and Roger E. Beyler, Westfield, N.J., assignors to Merck & Co., Inc., Rahway, N.J., a corporation of New Jersey No Drawing. Application December 8, 1954
Serial No. 474,037

3 Claims. (Cl. 260—397.45)

This invention relates to 9α-halo-steroids and particularly to 9α-halo-11-oxygenated-allopregnane-3,20-dione compounds; 21-esters thereof and processes for preparing these compounds.

The compounds which are the subject of the invention are 9α-halo-11-oxygenated-allopregnane compounds having the following structural formula:

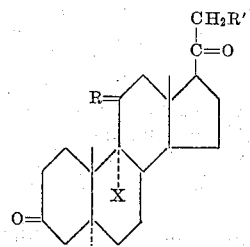

wherein R is a keto group (=O) or a hydroxy and hydrogen group

R′ is hydrogen, hydroxy, or an ester group and X is a halogen. These compounds have been found to possess cortisone-like activity.

The 9α-halo-11-oxygenated-allopregnane compounds are prepared by the hydrogenation of the corresponding 4-pregnene in the presence of a selective hydrogenation catalyst, such as palladium supported on a carbon carrier or Raney nickel. This reaction may be chemically represented, as follows:

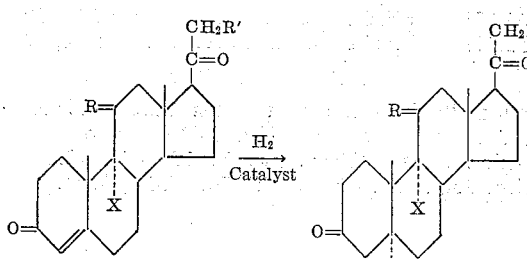

The process is preferably carried out by dissolving or suspending the corresponding 4-pregnene in a suitable solvent, such as ethyl acetate, ethanol, isopropyl alcohol, methanol, benzene, acetone, or ethyl ether. The hydrogenation catalyst is then added to the solution or suspension and the mixture agitated while subjecting it to the action of hydrogen. When the conversion is complete, the allopregnane is separated from the reaction mixture by suitable means, such as by filtration from the catalyst followed by distilling the solvent from the filtered reaction mixture, and crystallizing the product from a suitable solvent, or alternatively the product may be isolated by chromatography.

The hydrogenation catalyst is preferably used in the range of from about 5 to 150% by weight, based on the weight of the pregnene, lesser or greater amounts of catalyst can also be used if desired. The preferred catalysts are palladium supported on charcoal, such as 5% palladium on charcoal, and Raney nickel.

The reaction may be carried out by using hydrogen at sub-atmospheric or super-atmospheric pressure, but is preferably carried out at atmospheric pressure. The temperature of the reaction may be varied to control the rate of reaction with normal room temperature, 25 to 30° C. being preferred, although lower and higher temperatures can be used.

The starting material is a 9α-halo-4-pregnene-11β-ol-3,20-dione, a 9α-halo-4-pregnene-11β,21-diol-3,20-dione, a 9α-halo-4-pregnene-21-ol-3,11,20-trione, or one of their 21-esters. The halo group can be a fluoro, bromo, chloro or iodo group. The reaction proceeds most favorably with 21-ester derivatives when the 21 ester group contains from one to eight carbon atoms. Typical examples of suitable 21-ester groups are acetate, propionate, formate, butyrate, benzoate, t-butylacetate, hemisuccinate, and phenylacetate. Examples of typical 9α-halo-11-oxygenated-allopregnane compounds produced according to the invention are:

9α-fluoro-allopregnane-21-ol-3,11,20-trione
9α-fluoro-allopregnane-11β,21-diol-3,20-dione
9α-fluoro-allopregnane-11β,21-diol-3,20-dione 21-propionate
9α-fluoro-allopregnane-11β,21-diol-3,20-dione 21-butyrate
9α-fluoro-allopregnane-11β,21diol-3,20-dione 21-hemisuccinate
9α-fluoro-allopregnane-11β,21-diol-3,20-dione 21-t-butylacetate
9α-fluoro-allopregnane-11β,21-diol-3,20-dione 21-phenylacetate
9α-fluoro-allopregnane-11β,21-diol-3,20-dione 21-benzoate
9α-bromo-allopregnane-21-ol-3,11,20-trione
9α-chloro-allopregnane-21-ol-3,11,20-trione
9α-iodo-allopregnane-21-ol-3,11,20-trione
9α-bromo-allopregnane-11β,21-diol-3,20-dione
9α-chloro-allopregnane-11β,21-diol-3,20-dione
9α-iodo-allopregnane-11β,21-diol-3,20-dione
9α-fluoro-allopregnane-21-ol-3,11-20-trione 21-phosphate
9α - fluoro - allopregnane - 11β,21 - diol - 3,20 - dione 21-phosphate
9α-fluoro-allopregnane-3,11,20-trione
9α-fluoro-allopregnane-11β-ol-3,20-dione
9α-chloro-allopregnane-11β-ol-3,20-dione
9α-bromo-allopregnane-11β-ol3,20-dione In some instances it is more expedient to convert 4-pregenes having a 21-hydroxy group to the corresponding allopregnane and then convert the 21-hydroxy group to a 21-ester group thereby giving the allopregnane the physical characteristic of the ester. This conversion can be readily accomplished by reacting the 21-hydroxy allopregnane with an acylating agent such as aliphatic acid halides, esters, ketones, or anhydrides, in a suitable solvent medium. Organic bases, as for example, amines such as pyridine and alkyl derivatives thereof, tertiary bases such as dialkyl anilines, quinolines and trialkyl amines, are suitable as mediums for carrying out the reaction. The reaction is preferably carried out by adding the allopregnane to a solution of an aliphatic acid anhydride and an organic base. After the reaction is complete, the ester is conveniently recovered by evaporating the reaction mixture to dryness.

The following examples are given for purposes of illustration:

EXAMPLE 1

9α-fluoro-allopregnane-11β,21-diol-3,20-dione

To a solution of 150 mg. sample of 9α-fluoro-4-pregnene-11β,21-diol-3,20-dione in 10 ml. of methanol is added 85 mg. of 5% palladium on charcoal catalyst. The entire mixture is then hydrogenated at approximately 25° C. and atmospheric pressure for about ½ hour during which time 16 ml. of hydrogen are absorbed. The catalyst is removed by filtration and the filtrate containing the product 9α-fluoro-allopregnane-11β,21-diol-3,20-dione is concentrated in vacuo. Substantially pure product is obtained by chromatography over alumina.

EXAMPLE 2

21-t-butylacetate of 9α-fluoro-allopregnane-11β,21-diol-3,20-dione

The product of Example 1 is converted to its 21-t-butylacetate by treatment with a slight molar excess of t-butylacetyl chloride in pyridine.

EXAMPLE 3

9α-chloro-allopregnane-11β,21-diol-3,20-dione

A 50 mg. sample of 9α-chloro-4-pregnane-11β,21-diol-3,20-dione is hydrogenated catalytically in the manner described in Example 1. The product is isolated using the same procedure.

EXAMPLE 4

21-benzoate of 9α-chloro-allopregnane-11β,21-diol-3,20-dione

The product of Example 3 is converted to its 21-benzoate ester by treatment with a slight excess of benzoyl chloride in pyridine at approximately 0° C.

EXAMPLE 5

21-acetate of 9α-bromo-allopregnane-11β,21-diol-3,20-dione

Following the procedure of Example 1 a 100 mg. sample of 9α-bromo-4-pregnene-11β,21-diol-3,20-dione 21-acetate is hydrogenated to produce the corresponding 21-acetate of 9α-bromo-allopregnane-11β,21-diol-3,20-dione.

EXAMPLE 6

9α-fluoro-allopregnane-11β-ol-3,20-dione

Following the procedure of Example 1 a 100 mg. sample of 9α-fluoro-4-pregnene-11β-ol-3,20-dione is hydrogenated to produce 9α-fluoro-allopregnane-11β-ol-3,20-dione.

EXAMPLE 7

21-acetate of 9α-fluoro-allopregnane-11β,21-diol-3,20-dione

To a solution of 100 mg. of 9α-fluoro-4-pregnene-11β,21-diol-3,20-dione-21-acetate in 10 ml. of methanol is added 100 mg. of 5% palladium on charcoal catalyst. The entire mixture is then hydrogenated at approximately 25° C. and atmospheric pressure for about 10 minutes during which time 13 ml. of hydrogen are absorbed. The catalyst is removed by filtration and the filtrate containing the product is concentrated in vacuo. Substantially pure product, 9α-fluoro-allopregnane-11β,21-diol-3,20-dione-21-acetate is obtained by crystallization from ether. Melting point 176–177° C.

EXAMPLE 8

1.0% topical ointment of allopregnane-11β,21-diol-3,20-dione-21-acetate

Formula:

| | Grams |
|---|---|
| Allopregnane-11β,21-diol-3,20-dione-21-acetate | 0.010 |
| Zinc stearate | 0.078 |
| Propylene glycol | 0.307 |
| Carbowax 1500 | 0.380 |
| Carbowax 4000 | 0.180 |
| Distilled water | 0.045 |
| | 1.000 |

(1) Melt the carbowaxes and with stirring add the propylene glycol, zinc stearate, the steroid, and water.

(2) Pass the resulting ointment through a roller mill using cold rollers until the ointment is smooth. The resulting ointment is especially suited for dermatologic use.

A suitable 2.5% ointment of the above compound may be prepared by proportionately increasing the amount of steroid and proportionately decreasing the amount of zinc stearate used in the ointment. Other suitable ointments may be prepared by substituting in the above formula one of the 9α-fluoro steroids described in the preceding examples.

Any departure from the above description which conforms to the present invention is intended to be included within the scope of the claims.

What is claimed is:

1. 9α-halo-allopregnane-21-ol-3,11,20-trione.
2. 21-acylate of 9α-halo-allopregnane-21-ol-3,11,20-trione wherein the acyl radical has the formula

and R″ is a hydrocarbon group containing less than nine carbon atoms.

3. 21-acetate of 9α-fluoro-allopregnane-21-ol-3,11,20-trione.

References Cited in the file of this patent

UNITED STATES PATENTS

| 2,763,671 | Fried | Sept. 18, 1956 |
| 2,852,511 | Fried et al. | Sept. 16, 1958 |

OTHER REFERENCES

Natural Products Related to Phenanthrene, Fieser et al., 3rd edition, pages 240, 241 and 421 relied on.

Fried: Jour. Am. Chem. Soc., 75, 2273–74 (1953).

Fried: Jour. Am. Chem. Soc., 76, 1455 (1954).